(12) United States Patent
Matsuo et al.

(10) Patent No.: US 6,603,876 B1
(45) Date of Patent: Aug. 5, 2003

(54) STEREOSCOPIC PICTURE OBTAINING DEVICE

(75) Inventors: Hideaki Matsuo, Fukuoka (JP); Kazuyuki Imagawa, Fukuoka (JP); Yuji Takata, Fukuoka (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/349,968

(22) Filed: Jul. 9, 1999

(30) Foreign Application Priority Data

Jul. 9, 1998 (JP) .......................................... 10-194031

(51) Int. Cl.[7] .............................................. G03B 35/10
(52) U.S. Cl. ...................... 382/154; 396/326; 396/333; 359/377; 348/49
(58) Field of Search ................................ 382/154, 318; 396/326, 332, 333, 324; 359/376–378, 462; 600/111, 166; 348/139, 47–50, 72; 356/12–14

(56) References Cited

U.S. PATENT DOCUMENTS

| | | | | |
|---|---|---|---|---|
| 3,825,328 A | | 7/1974 | Hoch ........................... 352/60 |
| 4,523,226 A | * | 6/1985 | Lipton et al. .................. 358/88 |
| 4,967,267 A | * | 10/1990 | Gallaher, Jr. .................. 358/88 |
| 5,003,385 A | * | 3/1991 | Sudo ............................. 358/88 |
| 5,191,203 A | * | 3/1993 | McKinley ................. 250/208.1 |
| 5,307,151 A | | 4/1994 | Hof et al. .................... 356/376 |
| 5,485,312 A | * | 1/1996 | Horner et al. ............... 359/561 |
| 5,588,948 A | * | 12/1996 | Takahashi et al. ........... 600/111 |
| 5,673,147 A | * | 9/1997 | McKinley ................... 359/462 |
| 5,727,239 A | * | 3/1998 | Hankawa et al. ............ 396/111 |
| 5,751,341 A | * | 5/1998 | Chaleki et al. ................ 348/65 |
| 5,768,151 A | | 6/1998 | Lowy et al. .................. 364/550 |
| 5,786,848 A | * | 7/1998 | Isobe et al. .................... 348/51 |
| 5,818,399 A | | 10/1998 | Omori et al. .................. 345/8 |
| 5,835,133 A | * | 11/1998 | Moreton et al. ............... 348/49 |
| 5,874,987 A | * | 2/1999 | Itoh ............................. 348/49 |
| 5,910,999 A | * | 6/1999 | Mukohzaka ................. 382/124 |
| 6,144,762 A | * | 11/2000 | Brooks ........................ 382/154 |

FOREIGN PATENT DOCUMENTS

| | | |
|---|---|---|
| BE | 1005274 A6 | 6/1993 |
| JP | 7-248212 A | 9/1995 .......... G01B/11/24 |

OTHER PUBLICATIONS

"Image of 3D Space–Mathematical Geometry", pp. 142–143, Koichiro Deguchi, May, 1991 (ISBN4–7856–2125–7C3355).
Patent Abstracts of Japan, vol. 12, No. 156 (P–701), May 13, 1988 & JP 62 273526 A (Tsuji Optical Kenkyusho K.K.).

* cited by examiner

Primary Examiner—Brian Werner
(74) Attorney, Agent, or Firm—Wenderoth, Lind & Ponack, L.L.P.

(57) ABSTRACT

Two pictures of a subject obtained by objective lenses and from different locations of viewpoint are respectively rotated by dove prisms, 90 degrees clockwise, and then merged into a single picture by total reflection mirrors. The picture after synthesis is reduced at a predetermined ratio by a condenser lens, and then projected onto a pickup plane of a CCD. It is therefore possible to obtain stereoscopic pictures having parallax as a single picture using a single camera without narrowing the effective fields of view of right and left pictures of different viewpoints.

5 Claims, 10 Drawing Sheets

| 0 | NO CHANGE |
|---|---|
| 1 | 90 DEGREES CLOCKWISE |
| 2 | 180 DEGREES CLOCKWISE |
| 3 | 270 DEGREES CLOCKWISE |

FIG. 10

| 0 | RIGHT, LEFT |
|---|---|
| 1 | LEFT, RIGHT |
| 2 | TOP, BOTTOM |
| 3 | BOTTOM, TOP |

FIG. 11 PRIOR ART

STEREOSCOPIC PICTURE OBTAINING DEVICE

BACKGROUND OF THE INVENTION

1. Field of the Invention

The present invention relates to stereoscopic picture obtaining devices, and more specifically to a stereoscopic picture obtaining device for obtaining two stereoscopic pictures having parallax.

2. Description of the Background Art

A method in which two cameras simultaneously shoot the same subject from different locations of viewpoint to measure the three-dimensional position of the subject based on parallax information of two shot pictures has been known (hereinafter referred to as first background art). An exemplary method of this type is described in "Image of 3D Space-Mathematical Geometry", pp. 142–143, Koichiro Deguchi, published by Shokodo, May, 19941 (ISBN4-7856-2125-7C3355).

Japanese Patent Laying-Open No. 7-248212 discloses a method of obtaining a stereoscopic picture including parallax information using a single camera (hereinafter referred to as second background art). A three-dimensional shape measuring device according to the second background art is structured so that four mirrors are provided in front of a camera, simultaneously capturing a left picture from a left viewpoint and a right picture from a right viewpoint, and the obtained left and right pictures are entered into left-half and right-half fields of view, respectively, of the single camera.

The above first background art obtains a stereoscopic picture using two cameras and, therefore, requires two picture systems, resulting in a large system structure and high costs.

Figure 11:
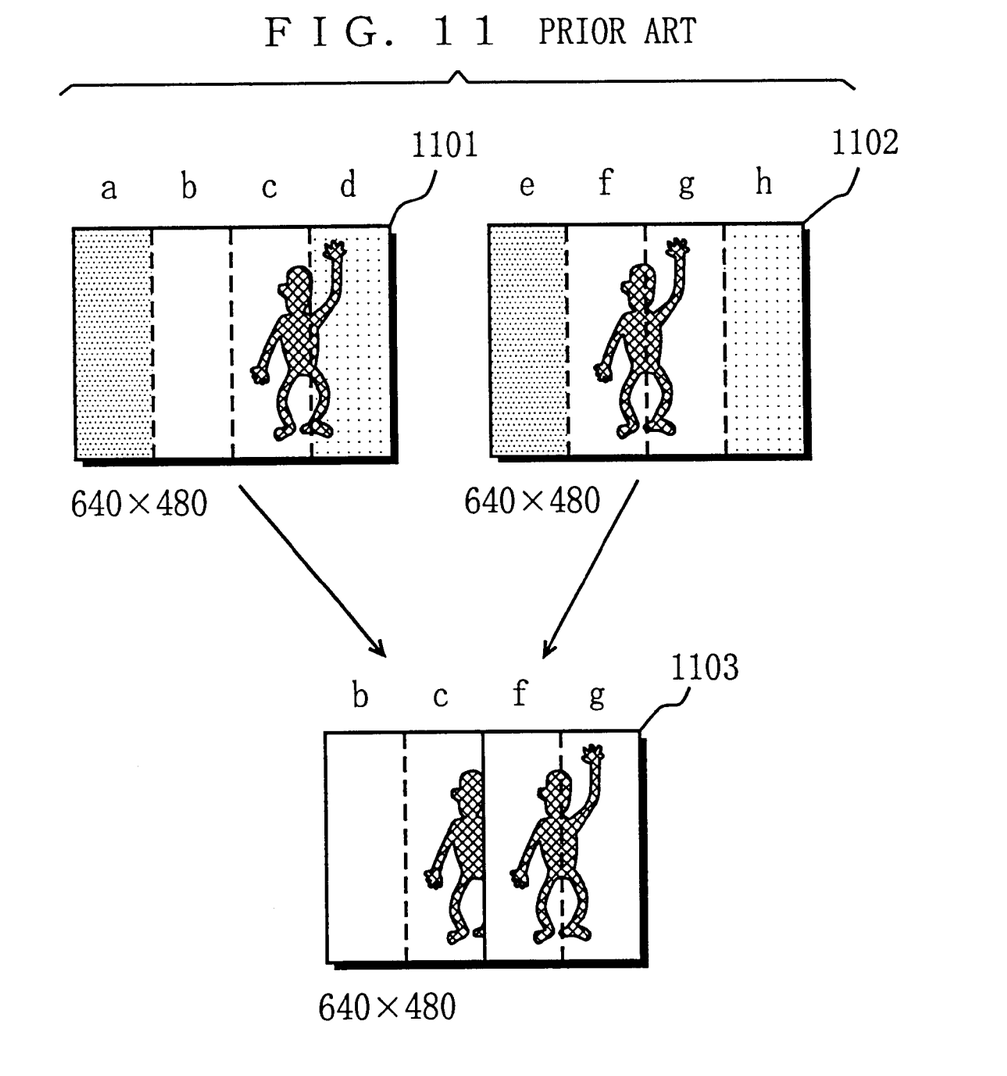
FIG. 11 is a diagram for describing that a field of view is restricted in a conventional stereoscopic picture obtaining device.

On the other hand, in the above second background art, the field of view of the single camera is divided into halves, a left-half and a right-half, and these two fields of view after division independently capture left and right pictures. Therefore, the angle of view when the subject is viewed from one of the fields of view after division becomes half the angle of view when viewed from the entire field of view of the camera. This will be described more specifically referring to FIG. 11. Assuming that the picture size of the entire field of view in the camera is, for example, 640*480 pixels, a left picture and a right picture when shot in full size are represented by a left picture 1101 and a right picture 1102 in FIG. 11. However, these left and right pictures 1101 and 1102 are too large to be stored as they are, in the left and right fields of view, respectively. Therefore, portions of the left picture 1101 in areas b and c (320*480 pixels) are stored in the left field of view of the camera, and portions of the right picture 1102 in areas f and g (320*480 pixels) are stored in the right field of view of the camera. That is, the effective fields of view in the lateral direction of the left and right pictures 1101 and 1102 are halved. As a result, pictures of peripheral parts a and d of the left picture 1101 and pictures of peripheral parts e and h of the right picture 1102 are disadvantageously eliminated. This does not allow parallax information of the whole subject to be obtained, causing difficulty of measuring the three-dimensional position.

SUMMARY OF THE INVENTION

Therefore, an object of the present invention is to provide a stereoscopic picture obtaining device capable of obtaining a single stereoscopic picture having parallax from two pictures with a wide effective field of view.

The present invention has the following various features to achieve the object above.

A first aspect of the present invention is directed to a stereoscopic picture obtaining device for obtaining a stereoscopic picture with parallax by a single camera. The device comprises two objective lenses for simultaneously obtaining two pictures of a subject from different locations of viewpoint, picture merge means for merging the two pictures obtained by the two objective lenses into a single picture through an optical operation, picture reducing means for reducing the single picture after synthesis by the picture merge means at a predetermined reduction ratio and projecting a picture onto a predetermined projection plane, and an image pickup device for converting the picture projected onto a pickup plane which is arranged on the projection plane into image data.

As described above, in the first aspect, two pictures of a subject obtained by the two objective lenses from different locations of viewpoint are merged into a single picture, and then reduced to be projected onto the image pickup device. It is therefore possible to obtain a single stereoscopic picture with parallax without narrowing the effective fields of view of the two pictures.

According to a second aspect, in the first aspect, the stereoscopic picture obtaining device further comprises, in any position of order of the objective lenses through the image pickup device, picture rotating means for rotating the picture or pictures through optical operation. As described above, in the second aspect, when two stereoscopic pictures do not fit well into the pickup plane of the image pickup device, it is possible to correct the relation in position between two pictures by rotation.

According to a third aspect, in the second aspect, the picture rotating means rotates the two pictures obtained by the two objective lenses before synthesis by the picture merge means, and the picture merge means merges the two pictures rotated by the picture rotating means into a single picture.

According to a fourth aspect, in the second aspect, the picture rotating means rotates the picture after synthesis by the picture merge means.

According to a fifth aspect, in the second aspect, the picture rotating means rotates the picture or pictures 90 degrees.

According to a sixth aspect, in the first aspect, the picture merge means arranges the two pictures obtained by the two objective lenses on right and left and generates a single merged picture.

According to a seventh aspect, in the first aspect, the picture merge means arranges the two pictures obtained by the two objective lenses on top and bottom and generates a single merged picture.

According to an eighth aspect, in the first aspect, the stereoscopic picture obtaining device further comprises aspect ratio changing means for reducing/enlarging the two pictures obtained by the two objective lenses through optical operation before synthesis by the picture merge means, thereby changing an aspect ratio of each of the two pictures. As described above, in the eighth aspect, by changing each aspect ratio of the two pictures obtained by the two objective lenses, it is possible to almost completely match the size of the merged picture after reduction with the size of the pickup plane of the image pickup device.

A ninth aspect is directed to a stereoscopic picture obtaining device for obtaining a stereoscopic picture with parallax. The device comprises two image taking means for shooting a subject from different locations of viewpoint and generating two sets of image data having parallax, image merge means for merging the two sets of image data generated by the two image taking means into a single set of image data through electrical operation, image reducing means for reducing the single set of image data after synthesis by the image merge means at a predetermined reduction ratio through electrical operation, and storage means for storing image data after reduction by the image reducing means.

As described above, in the ninth aspect, two sets of image data having parallax, generated by two image taking means, are merged into a single set of image data, and then reduced to be stored in the storage means. It is therefore possible to obtain a single set of image data having parallax without narrowing the effective fields of view of the two sets of image data, resulting in a small capacity of the storage device.

According to a tenth aspect, in the ninth aspect, the stereoscopic picture obtaining device further comprises, in any position of order of the image taking means through the storage means, image rotating means for rotating the image data through electrical operation.

As described above, in the tenth aspect, when the two sets of image data do not fit well into the frame size of the storage means, it is possible to correct the relation in positions between the image data by rotation.

According to an eleventh aspect, in the tenth aspect, the image rotating means rotates the two sets of image data generated by the two image taking means before synthesis by the image merge means, and the image merge means merges the two sets of image data rotated by the image rotating means into a single set of image data.

According to a twelfth aspect, in the tenth aspect, the image rotating means rotates the image data after synthesis by the image merge means.

According to a thirteenth aspect, in the tenth aspect, the image rotating means rotates the image data 90 degrees.

According to a fourteenth aspect, in the ninth aspect, the image merge means arranges the two sets of image data generated by the two image taking means on right and left and generates a single set of image data.

According to a fifteenth aspect, in the ninth aspect, the image merge means arranges the two sets of image data generated by the two image taking means on top and bottom and generates a single set of image data.

According to a sixteenth aspect, in the ninth aspect, the image reducing means reduces the single set of image data after synthesis by the image merge means, thereby changing an aspect ratio of the single image data. As described above, in the sixteenth aspect, by changing the aspect ratio of the image data after synthesis by the image merge means, it is possible to almost completely match the size of the merged image after reduction with the frame size of the storage means.

These and other objects, features, aspects and advantages of the present invention will become more apparent from the following detailed description of the present invention when taken in conjunction with the accompanying drawings.

DESCRIPTION OF THE PREFERRED EMBODIMENT

First Embodiment

Figure 1:
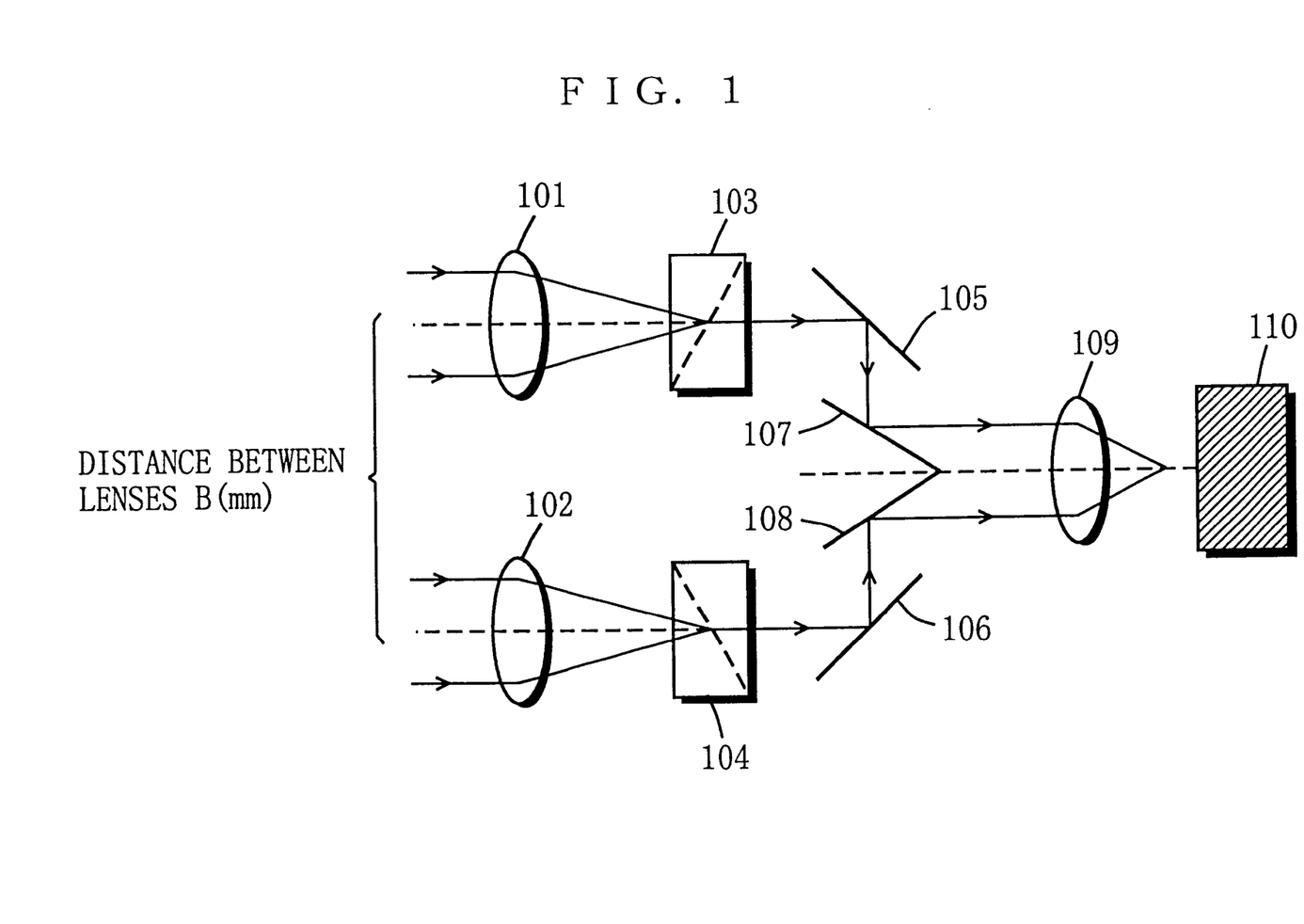
FIG. 1 is a diagram showing the structure of a stereoscopic picture obtaining device according to a first embodiment of the present invention.

FIG. 1 is a diagram showing the structure of a stereoscopic picture obtaining device according to a first embodiment of the present invention. In FIG. 1, the stereoscopic picture obtaining device of the present embodiment includes objective lenses 101 and 102 spaced a certain distance apart, a dove prism 103 provided corresponding to the objective lens 101, a dove prism 104 provided corresponding to the objective lens 102, total reflection mirrors 105 and 107 provided corresponding to the objective lens 101, total reflection mirrors 106 and 108 provided corresponding to the objective lens 102, a condenser lens 109, and a CCD 110 which is a solid state image pickup device.

Figure 2:
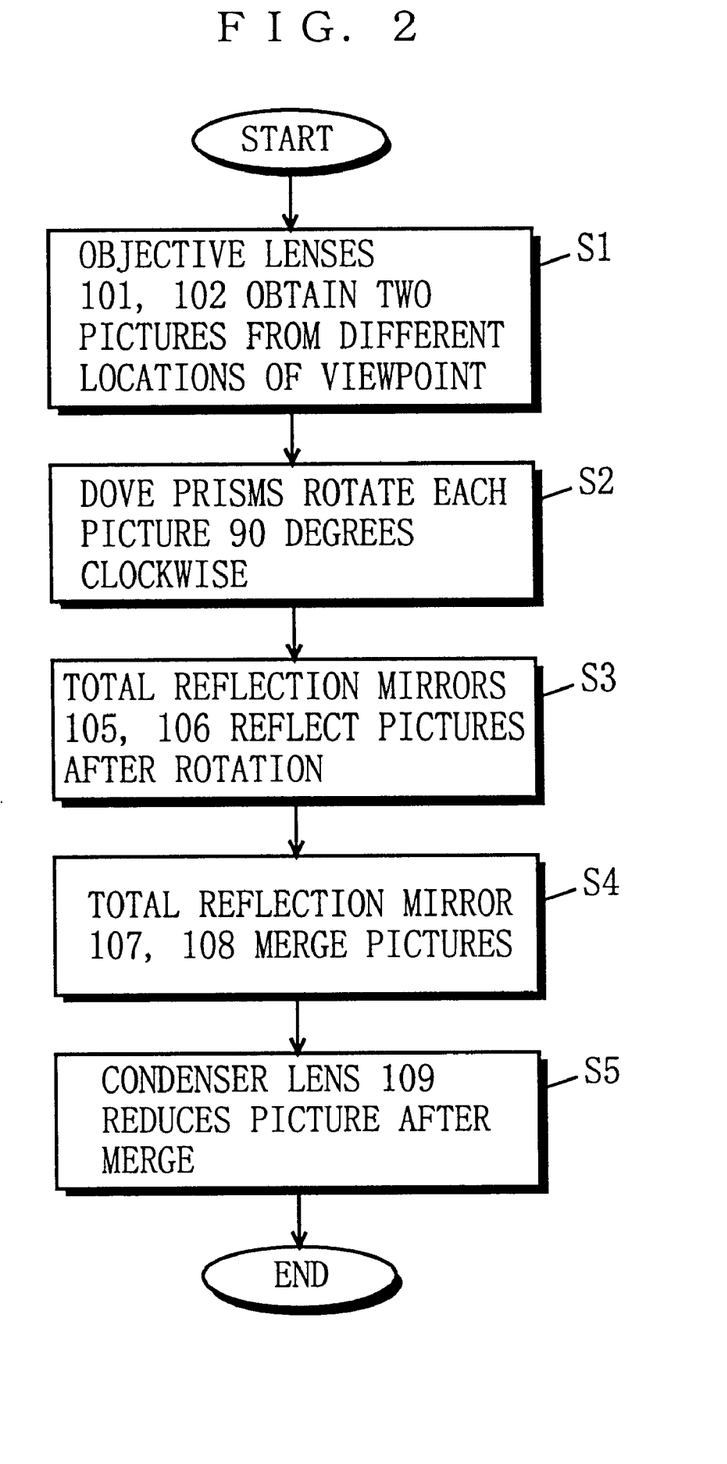
FIG. 2 is a flow chart showing operation of the stereoscopic picture obtaining device as shown in FIG. 1.
Figure 3:
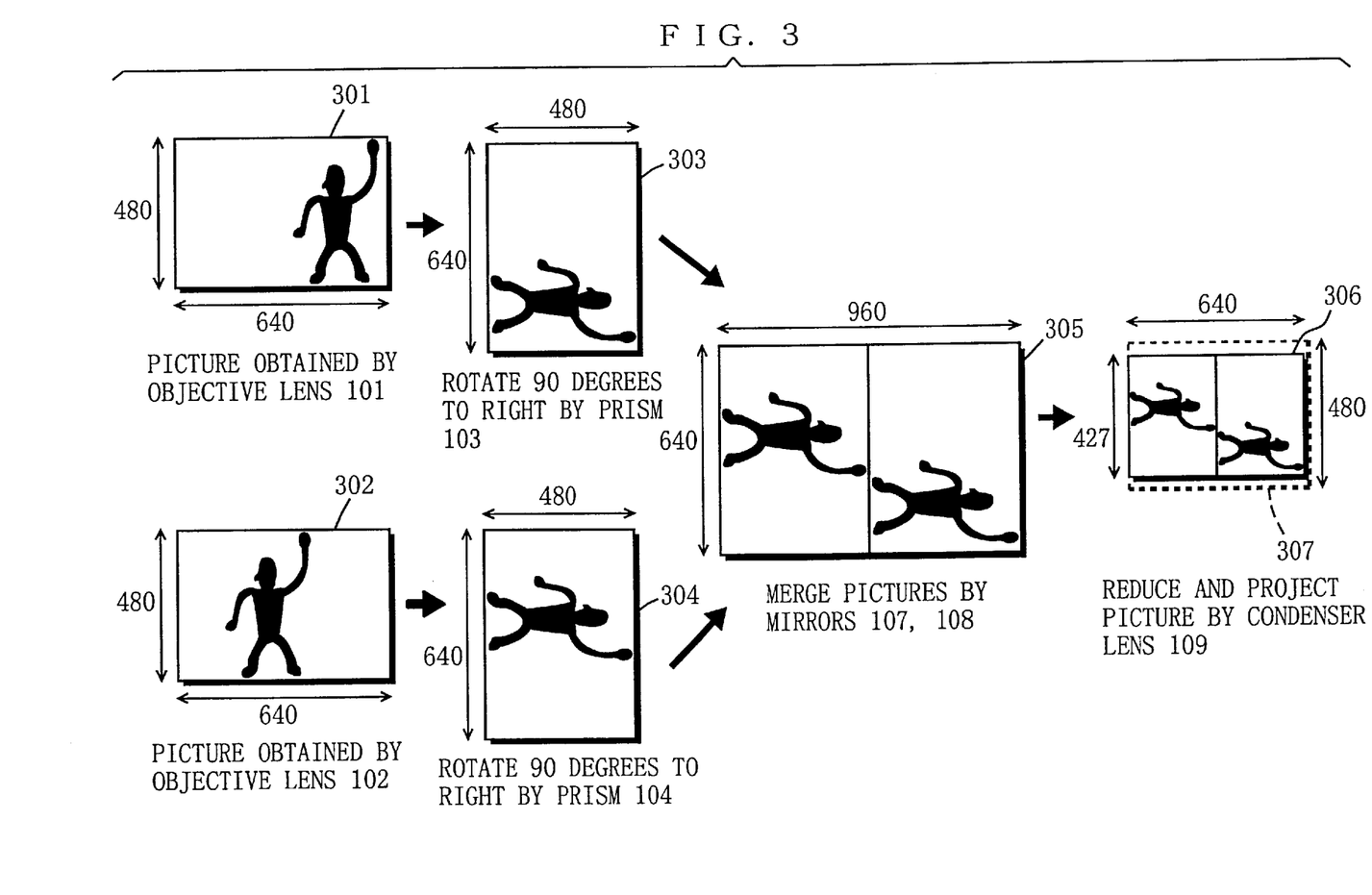
FIG. 3 is a diagram showing changes of obtained pictures in the stereoscopic picture obtaining device as shown in FIG. 1.

FIG. 2 is a flow chat showing operation of the stereoscopic picture obtaining device as shown in FIG. 1. FIG. 3 is a diagram showing changes of obtained pictures in the stereoscopic picture obtaining device as shown in FIG. 1. Described below is the operation in the embodiment shown in FIG. 1 referring to FIGS. 2 and 3.

First, the objective lenses 101 and 102 spaced a distance B mm apart simultaneously obtain pictures of a subject (not shown) from different locations of viewpoint (step S1). In FIG. 3, a picture 301 represents a picture obtained by the objective lens 101, and a picture 302 represents a picture obtained by the objective lens 102. Note that, for clear understanding of the field of view size, it is assumed herein that a picture of 640*480 pixels, which is equal to the size of a video signal, passes through the objective lenses 101 and 102.

The pictures 301 and 302 obtained at the same time by the objective lenses 101 and 102 are rotated 90 degrees clockwise by the dove prisms 103 and 104, respectively (step S2).

In FIG. 3, a picture 303 represents a picture after rotation by the dove prism 103, and a picture 304 represents a picture after rotation by the dove prism 104. The pictures 303 and 304 after rotation (480*640 pixels) are the same size as the pictures 301 and 302 (640*480 pixels), with each aspect (length-to-width) ratio reversed. The rotating direction of the pictures obtained by the objective lenses 101 and 102 is easily changeable by changing the setting direction of the dove prisms 103 and 104.

The pictures 303 and 304 after rotation by the dove prisms 103 and 104 are reflected by the total reflection mirrors 105 and 106, respectively, and projected onto the total reflection mirrors 107 and 108 (step S3).

The total reflection mirrors 107 and 108 reflect the projected pictures 303 and 304, respectively, so that the progressing directions of the pictures become parallel to each other, thereby merging the pictures 303 and 304 into a single picture (step S4). In FIG. 3, a picture 305 represents a picture after synthesis. The picture after synthesis becomes 960*640 (=480*640+480*640) pixels in size.

The picture 305 after synthesis (960*640 pixels) is reduced at a predetermined reduction ratio by the condenser lens 109, and projected onto a pickup plane of the CCD 110 (step S5). In FIG. 3, a picture 306 is a picture projected onto a pickup plane 307 of the CCD 110 after reduction by the condenser lens 109. Since the reduction ratio of the condenser lens 109 is ⅔ (=0.666. . . ) along any arbitrary perpendicular direction around an optical axis, the reduced picture 306 becomes 640*427 pixels in size.

As described above, according to the first embodiment, a single camera can obtain a stereoscopic picture with parallax without narrowing the fields of view of right and left pictures of different viewpoints.

Although the picture rotating operation is performed before the picture merge operation in the above first embodiment, the picture rotating operation may be performed after the picture merge operation.

Second Embodiment

Figure 4:
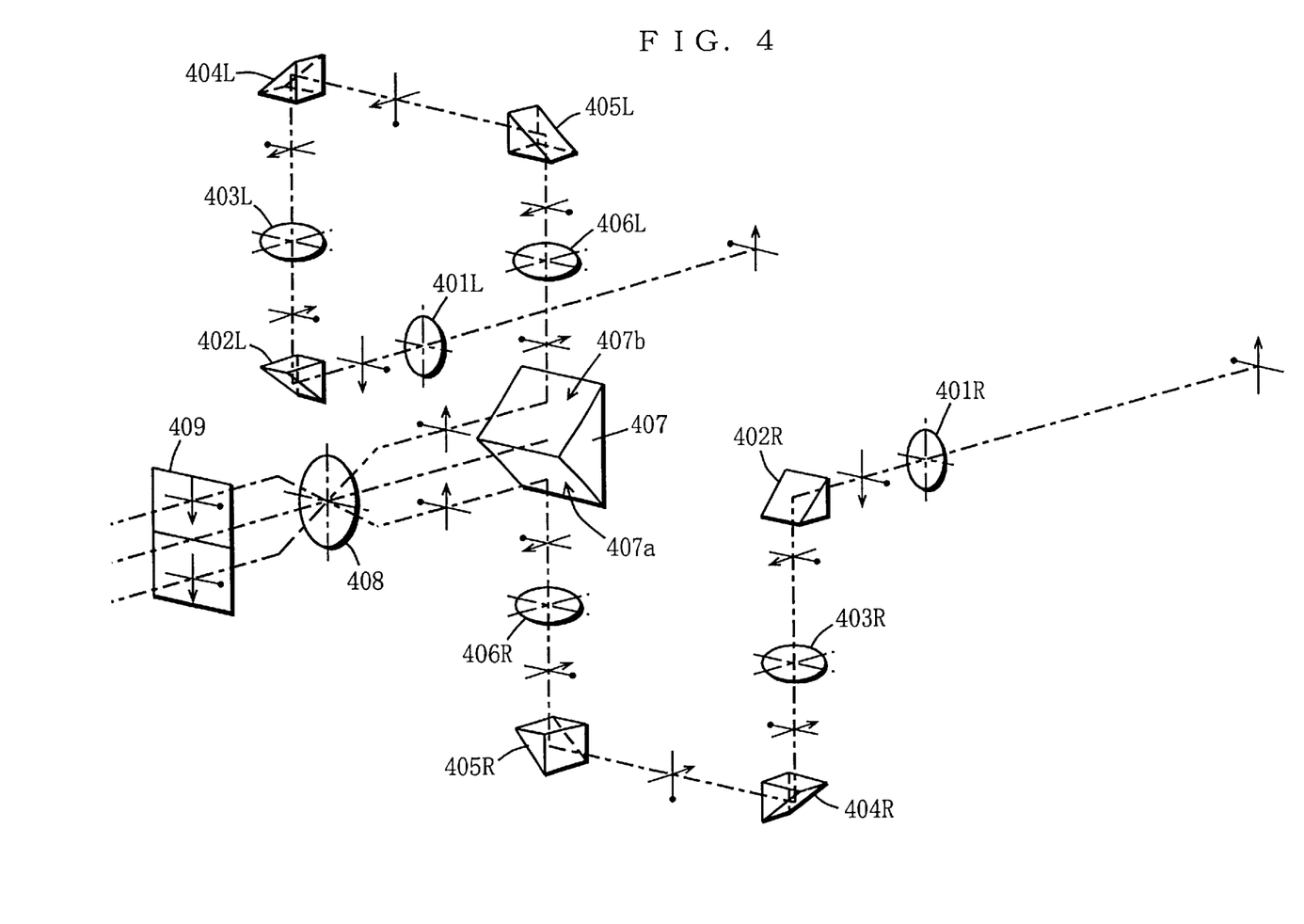
FIG. 4 is a diagram showing the structure of an optical system of a stereoscopic picture obtaining device according to a second embodiment of the present invention.

FIG. 4 is a diagram showing the structure of an optical system of a stereoscopic picture obtaining device according to a second embodiment of the present invention. In FIG. 4, the stereoscopic picture obtaining device of the present embodiment includes objective lenses 401R and 401L spaced a certain distance apart, first deflection prisms 402R and 402L, reducing/enlarging lenses 403R and 403L, second deflection prisms 404R and 404L, third deflection prisms 405R and 405L, image reversing lenses 406R and 406L, a merge prism 407, a condenser lens 408, and a CCD 409.

In the above first embodiment, the right and left pictures obtained by the objective lenses 101 and 102 are merged as they are, and then projected onto the pickup plane of the CCD 110. Therefore, as shown in FIG. 3, the length (427 pixels) of the reduced picture 306 is a little shorter than the length (480 pixels) of the pickup plane 307 of the CCD 110. That is, in the first embodiment, the pickup plane 307 of the CCD 110 is not fully utilized. On the other hand, in the second embodiment, by changing the aspect ratio of the right and left pictures obtained by the objective lenses 401R and 401L before merging them, the pickup plane of the CCD 409 can be fully utilized.

Figure 5:
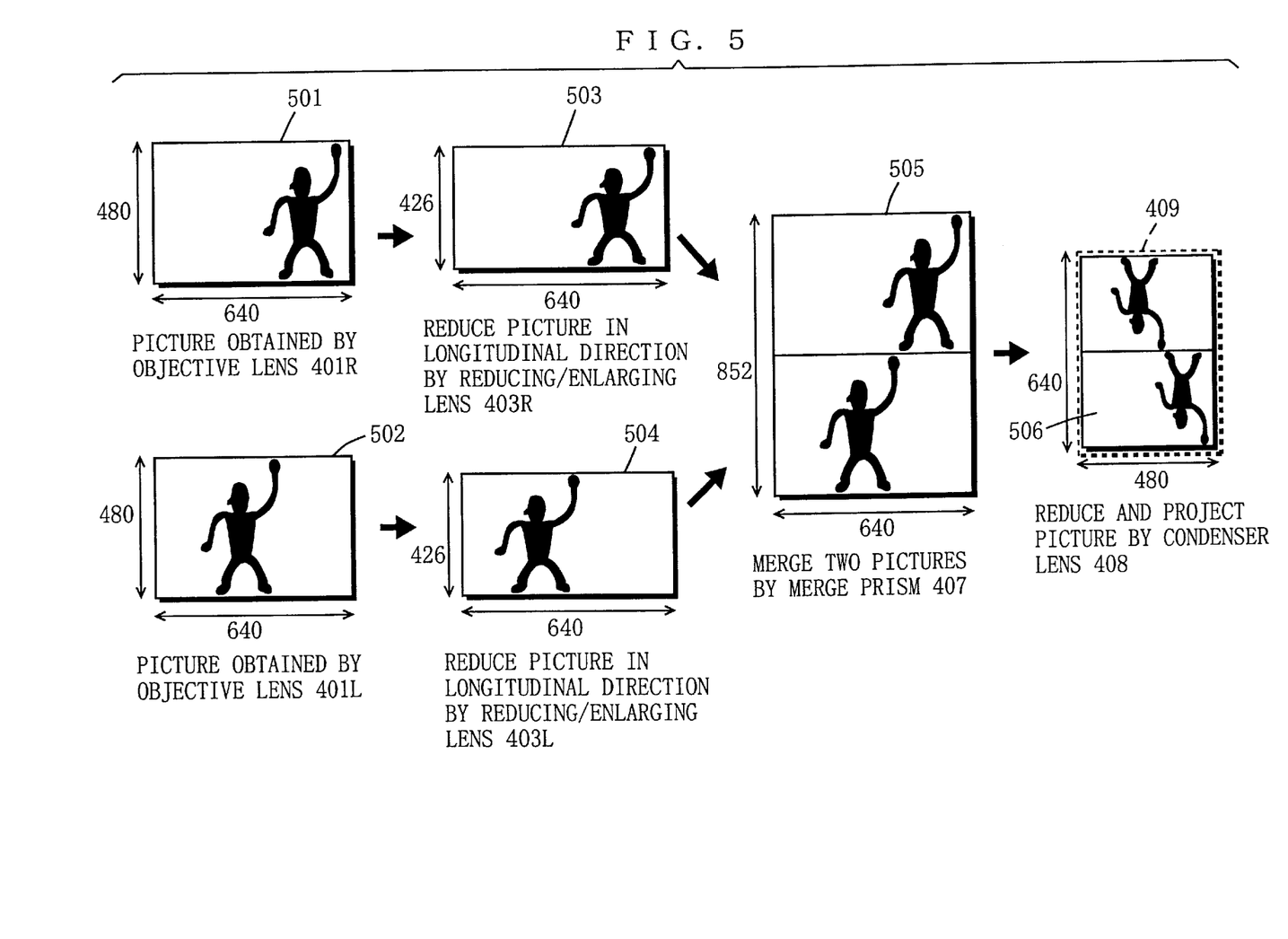
FIG. 5 is a diagram showing changes of obtained pictures in the stereoscopic picture obtaining device as shown in FIG. 4.

FIG. 5 is a diagram showing changes of obtained pictures in the stereoscopic picture obtaining device as shown in FIG. 4.

Described below is operation of the embodiment shown in FIG. 4 referring to FIG. 5.

First, the objective lenses 401R and 401L spaced a certain distance apart simultaneously obtain pictures of a subject (not shown) from different locations of viewpoint. In FIG. 5, a picture 501 represents a picture obtained by the objective lens 401R, and a picture 502 represents a picture obtained by the objective lens 401L. Note that, for clear understanding of the field of view size, it is assumed herein that a picture of 640*480 pixels, which is equal to the size of a video signal, passes through the objective lenses 401R and 401L.

The pictures 501 and 502 obtained at the same time by the objective lenses 401R and 401L are deflected in the progressing directions by the deflection prisms 402R and 402L, and entered into the reducing/enlarging lenses 403R and 403L, respectively. The reducing/enlarging lenses 403R and 403L reduce only the size in the longitudinal direction of the pictures 501 and 502, respectively. That is, the reducing/enlarging lenses 403R and 403L reduce the pictures 501 and 502, respectively, to change each aspect ratio. As the reducing/enlarging lenses 403R and 403L, a cylindrical lens may be used. In FIG. 5, a picture 503 represents a picture reduced by the reducing/enlarging lens 403R, and a picture 504 represents a picture reduced by the reducing/enlarging lens 403L. At this time, the picture 501 of 640*480 pixels is reduced to the picture 503 of 640*426 pixels, while the picture 502 of 640*480 pixels is reduced to the picture 504 of 640*426 pixels. The reduced picture 503 which passed through the reducing/enlarging lens 403R is deflected in the progressing direction by the deflection prisms 404R and 405R, and then reversed by the image reversing lens 406R to be entered into a first reflecting surface 407a of the merge prism 407. The reduced picture 504 which passed through the reducing/enlarging lens 403L is deflected in the progressing direction by the deflection prisms 404L and 405L, and then reversed by the image reversing lens 406L to be entered into a second reflecting surface 407b of the merge prism 407.

The merge prism 407 reflects the entered, reduced pictures 503 and 504 so that their progressing directions are parallel to each other, thereby merging these reduced pictures 503 and 504 into a single picture. In FIG. 5, a picture 505 represents a picture after synthesis. The picture 505 after synthesis becomes 640*852 (=640*426+640*426) pixels in size.

The picture 505 after synthesis is reduced at a predetermined reduction ratio by the condenser lens 408 and projected onto a pickup plane of the CCD 409. In FIG. 5, a picture 506 represents a picture projected onto the pickup plane of the CCD 409 after reduction by the condenser lens 408. Since the reduction ratio of the condenser lens 408 is ¾ (=0.75) along any arbitrary perpendicular direction around an optical axis, the reduced picture 506 becomes 480*640 pixels in size. Since the size of the pickup plane of the CCD 409 is 480*640 pixels, the pickup plane of the CCD 409 can be fully utilized in the second embodiment.

Figure 6:
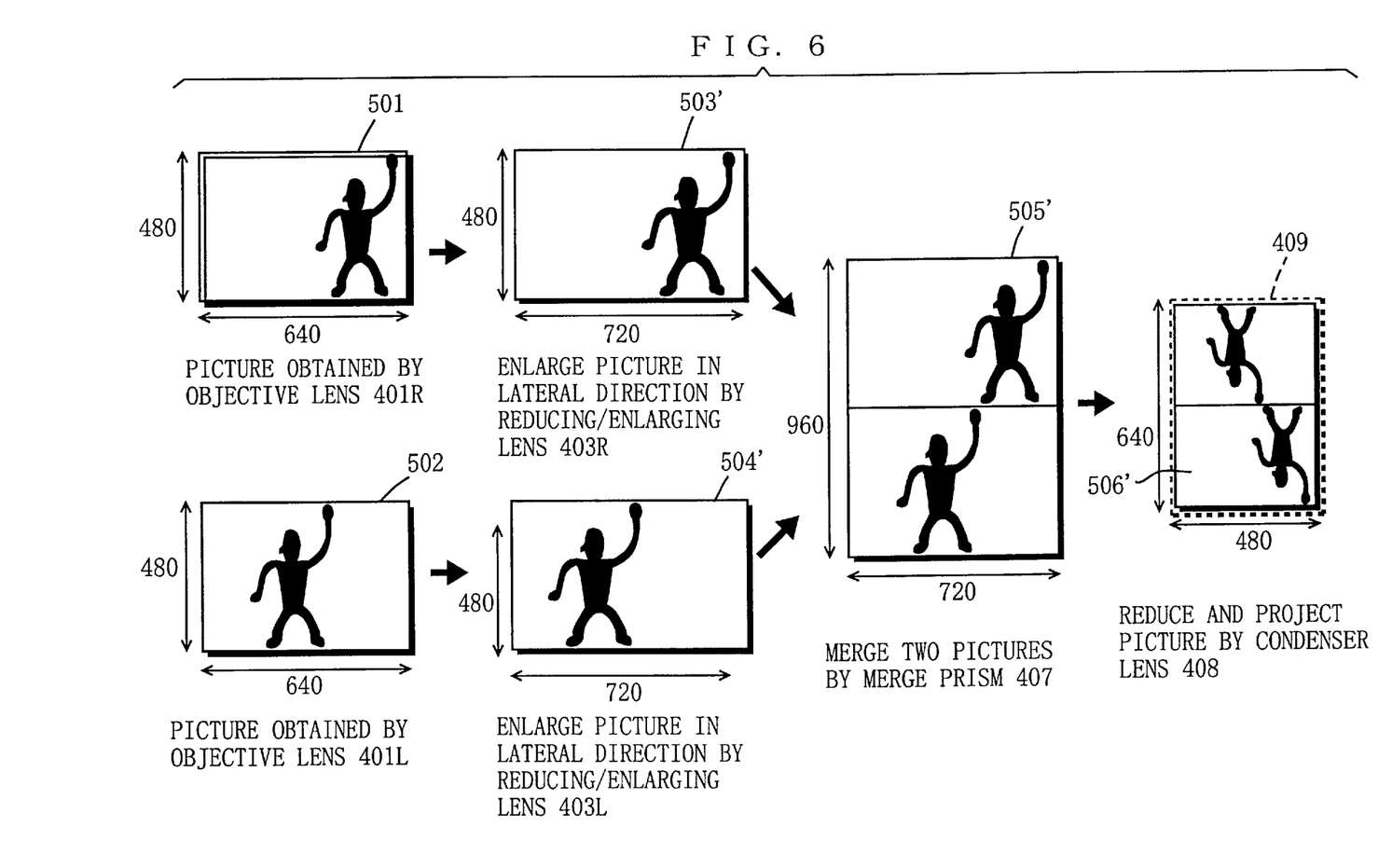
FIG. 6 is a diagram showing changes of pictures in the stereoscopic picture obtaining device as shown in FIG. 4 when a lens for enlargement in the lateral direction is used as a reducing/enlarging lens.

Although the reducing/enlarging lenses 403R and 403L reduce the size in the longitudinal direction of the pictures 501 and 502, respectively, in the above second embodiment, they may enlarge the size in the lateral direction. FIG. 6 shows changes of pictures in the stereoscopic picture obtaining device as shown in FIG. 4 when a lens for enlarging the size in the lateral direction is used for the reducing/enlarging lenses 403R and 403L. Described below is operation of another example of the embodiment shown in FIG. 4 referring to FIG. 6.

In FIG. 6, the pictures 501 and 502 obtained by the objective lenses 401R and 401L are deflected in the progressing direction by the deflection prisms 402R and 402L, respectively, and entered into the reducing/enlarging lenses 403R and 403L. As described above, the reducing/enlarging lenses 403R and 403L enlarge the size of the pictures 501 and 502, respectively, only in the lateral direction. In FIG. 6, a picture 503' represents a picture enlarged by the reducing/enlarging lens 403R, and a picture 504' represents a picture enlarged by the reducing/enlarging lens 403L.

In the present example, the picture 501 of 640*480 pixels is enlarged to the picture 503' of 720*480 pixels, while the picture 502 of 640*480 pixels is enlarged to the picture 504' of 720*480 pixels. The enlarged picture 503' is deflected in the progressing direction by the deflection prisms 404R and 405R, and then reversed by the image reversing lens 406R to be entered into the first reflection surface 407a of the merge prism 407. The enlarged picture 504' is deflected in the progressing direction by the deflection prisms 404L and 405L, and then reversed by the image reversing lens 406L to be entered into the second reflection surface 407b of the merge prism 407.

The merge prism 407 reflects the entered, enlarged pictures 503' and 504' so that their progressing directions are parallel to each other, thereby merging these enlarged pictures 503' and 504' into a single picture. In FIG. 6, the picture 505' represents a picture after synthesis. The picture 505' after synthesis becomes 720*960 (=720*480+720*480) pixels in size.

The picture 505' after synthesis is reduced at a predetermined ratio by the condenser lens 408 and projected onto the pickup plane of the CCD 409. In FIG. 6, a picture 506' represents a picture projected onto the pickup plane of the CCD 409 after reduction by the condenser lens 408. Since the reduction ratio of the condenser lens 408 is ⅔ (=0.666 . . . ) along any arbitrary perpendicular direction around an optical axis, the reduced picture 506' becomes 480*640 pixels in size.

In the above first embodiment, the obtained pictures are reversed 90 degrees before merged. In the above second embodiment, however, the aspect ratio of the pictures obtained by the objective lenses has a reverse relation with the aspect ratio of the CCD 409, and therefore it is not required to rotate the obtained pictures before merging them. As evident from the above, picture rotating operation is not absolutely necessary for the present invention. The same goes for a third embodiment which will be described below.

Third Embodiment

Figure 7:
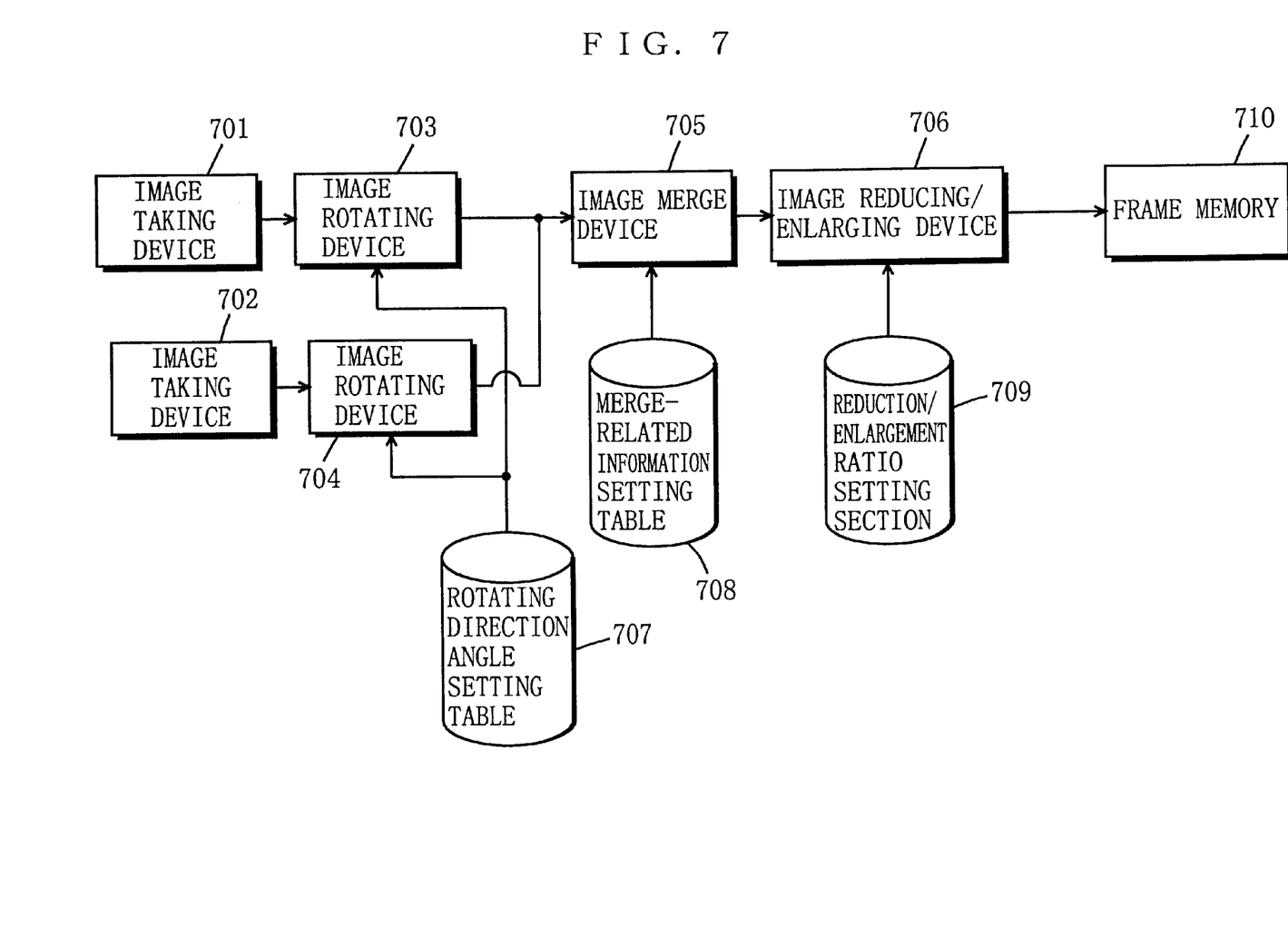
FIG. 7 is a block diagram showing the structure of a stereoscopic picture obtaining device according to a third embodiment of the present invention.

FIG. 7 is a block diagram showing the structure of the stereoscopic picture obtaining device according to the third embodiment of the present invention. In FIG. 7, the stereoscopic picture obtaining device of the present embodiment includes image taking devices 701 and 702, image rotating devices 703 and 704, an image merge device 705, an image reducing/enlarging device 706, a rotating direction angle setting table 707, a merge-related information setting table 708, a reduction/enlargement ratio setting section 709, and frame memory 710. The image taking devices 701 and 702 each include an objective lens and a CCD. Assume that a value representing a rotating direction of an image (hereinafter referred to as rotating direction value) is previously set in the image rotating devices 703 and 704, and a value representing a merge state of images (hereinafter referred to as merge state value) is previously set in the image merge device 705. Further, assume that reduction/enlargement ratios in the lateral and longitudinal directions of an image are set in the reduction/enlargement ratio setting section 709.

Figure 8:
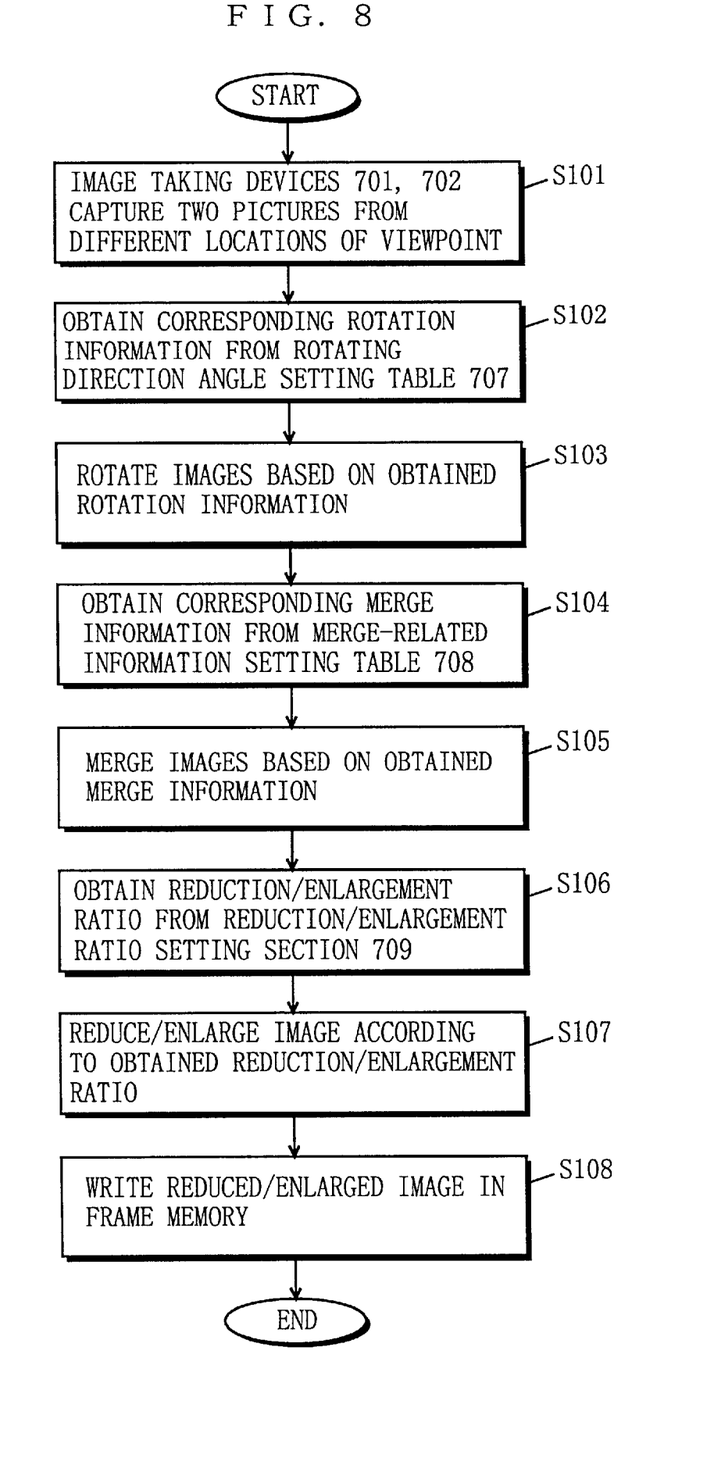
FIG. 8 is a flow chart showing operation of the stereoscopic picture obtaining device as shown in FIG. 7.

FIG. 8 is a flow chart showing operation of the stereoscopic picture obtaining device as shown in FIG. 7. Described below is the operation of the stereoscopic picture obtaining device according to the third embodiment referring to FIG. 8.

Figure 9:
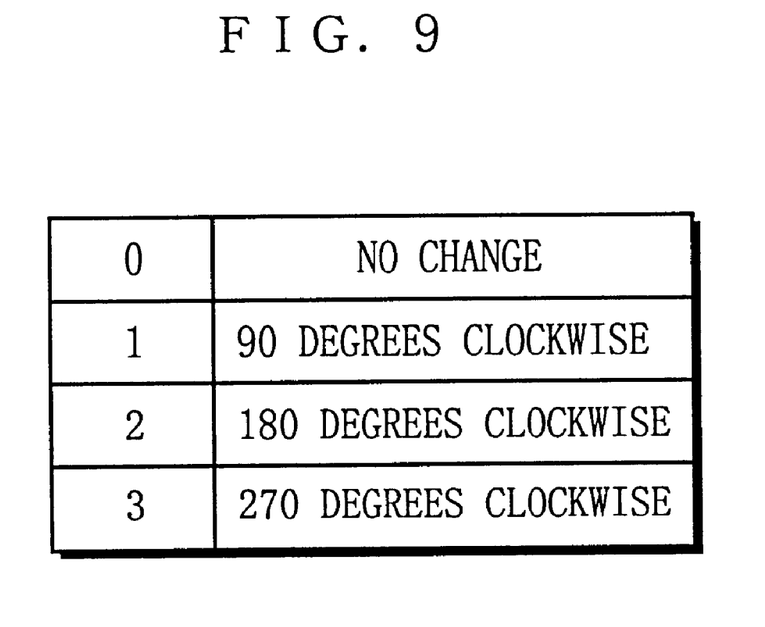
FIG. 9 is a diagram showing an example of rotation information registered in a rotating direction angle setting table in FIG. 7.

First, the two image taking devices 701 and 702 shoot a subject (not shown) from different locations of viewpoint to generate two sets of image data from different locations of viewpoint (step S101). The two sets of image data outputted from the image taking devices 701 and 702 are inputted to the image rotating devices 703 and 704, respectively. The image rotating devices 703 and 704 then take out rotation information corresponding to the preset rotating direction value from the rotating direction angle setting table 707 (step S102). FIG. 9 shows an example of the rotation information registered in the rotating direction angle setting table 707. In FIG. 9, rotation information corresponding to "0" represents that an image is not rotated; rotation information corresponding to "1" represents that an image is rotated 90 degrees clockwise; rotation information corresponding to "2" represents that an image is rotated 180 degrees clockwise; and rotation information corresponding to "3" represents that an image is rotated 270 degrees clockwise. The image rotating devices 703 and 704 then rotate the image data provided by the image taking devices 701 and 702, respectively, based on the rotation information taken out from the rotating direction angle setting table 707. The image data rotating operation itself has been an established technique called affine transformation. More specifically, the image rotating devices 703 and 704 rotate the image data using a predetermined transformation matrix equation, based on parameters provided by the obtained rotation information.

Figure 10:
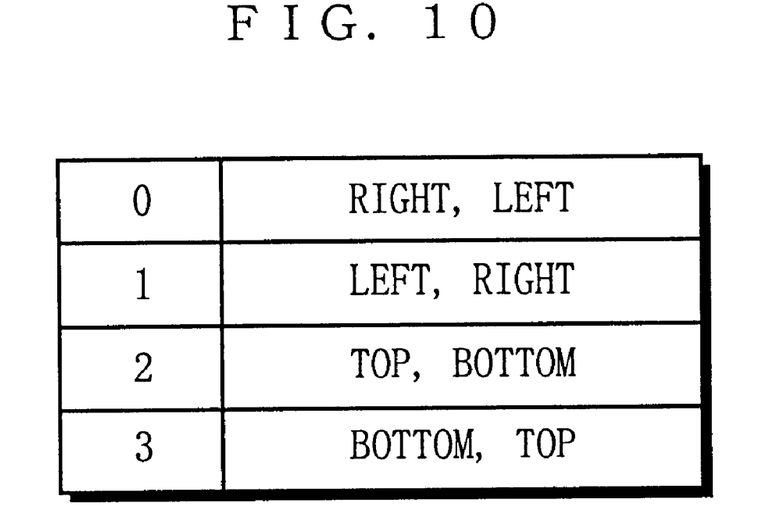
FIG. 10 is a diagram showing an example of synthesis information registered in a synthesis-related information setting table in FIG. 7.

The image merge device 705 then takes out merge information corresponding to the preset merge state value from the merge-related information setting table 708 (step S104). FIG. 10 shows an example of the merge information registered in the merge-related information setting table 708. In FIG. 10, merge information corresponding to a value "0" represents that the output image of the image rotating device 703 is arranged on the right, while the output image of the image rotating device 704 on the left; merge information corresponding to a value "1" represents that the output image of the image rotating device 703 is arranged on the left, while the output image of the image rotating device 704 on the right; merge information corresponding to a value "2" represents that the output image of the image rotating device 703 is arranged on the top, while the image of the image rotating device 704 on the bottom; and merge information corresponding to a value "3" represents that the output image of the image rotating device 703 is arranged on the bottom, while the image of the image rotating device 704 on the top. The image merge device 705 then merges the image data provided by the image rotating devices 703 and 704 based on the merge information taken out from the merge-related information setting table 708 (step S105).

The image reducing/enlarging device 706 then reads out the reduction/enlargement ratios set in the reduction/enlargement ratio setting section 709 (step S106). The image reducing/enlarging device 706 then enlarges/reduces the merged image data provided by the image merge device 705 according to the reduction/enlargement ratios read out from the reduction/enlargement ratio setting section 709 (step S107). The image reducing/enlarging device 706 then writes the enlarged/reduced image data in the frame memory 710 (step S108).

Described below is more specific operation with specific values provided for the above third embodiment. Note that the following description of the operation is merely an example, and other variations can be devised depending on other values provided.

Assume that the size of the image data to be outputted from the image taking devices 701 and 702 is 640*480 pixels, and the pixel size of the frame memory 703 is 640*480. Further, assume that "1" is previously set as the rotating direction value in the image rotating devices 703 and 704, and "0" is previously set as the merge state value in the image merge device 705. Still further, assume that ⅔ (=0.666 . . . ) in the lateral direction and ¾ (=0.75) in the longitudinal direction are set as the reduction ratios in the reduction/enlargement ratio setting section 709. Under these conditions, the image rotating devices 703 and 704 rotate the image data provided by the image taking devices 701 and 702, 90 degrees clockwise, respectively. Therefore, the image data of 480*640 pixels is outputted from each of the image rotating devices 703 and 704. The image merge device 705 then generates merged image data in which the output image of the image rotating device 703 is arranged on the right and the output image of the image rotating device 704 is arranged on the left. Therefore, the merged image data becomes 960*640 pixels in size.

The image reducing/enlarging device 706 reduces the size of the provided merged image data by ⅔ (=0.666 . . . ) in the lateral direction and by ¾ (=0.75) in the longitudinal direction. Therefore, the size of the image data after reduction becomes 640*480 pixels.

While the invention has been described in detail, the foregoing description is in all aspects illustrative and not restrictive. It is understood that numerous other modifications and variations can be devised without departing from the scope of the invention.

What is claimed is:

1. A stereoscopic picture obtaining device for obtaining a stereoscopic picture by combining a first picture of a subject viewed from a first viewpoint and a second picture of the subject viewed from a second viewpoint having parallax with respect to the first viewpoint, said stereoscopic picture obtaining device comprising:

first and second objective lenses adapted to simultaneously capture the first picture of the subject viewed from the first viewpoint and the second picture of the subject viewed from the second viewpoint, respectively;

picture rotating means for rotating the first and second pictures about respective optical axes of said first and second objective lenses by 90 degrees in a state where the first and second pictures are disposed on a same plane before and after rotation;

picture merge means for merging the first and second pictures rotated by said picture rotating means into a single picture through an optical operation so that an upper side of the first picture viewed from the first viewpoint before rotation coincides with a lower side of the second picture viewed from the second viewpoint before rotation;

picture reducing means for reducing the single picture obtained by said picture merge means at a predetermined reduction ratio, and projecting the reduced picture onto a predetermined projection plane; and an image pickup device operable convert the picture projected onto a pickup plane which is arranged on the projection plane into image data.

2. The stereoscopic picture obtaining device according to claim 1, wherein said picture rotating means rotates the two pictures to a same direction.

3. A stereoscopic picture obtaining device for obtaining a stereoscopic picture by combining a first picture of a subject viewed from a first viewpoint and a second picture of the subject viewed from a second viewpoint having parallax with respect to the first viewpoint, said stereoscopic picture obtaining device comprising:

two image taking means for simultaneously shooting the subject viewed from the first viewpoint and the subject viewed from the second viewpoint, and generating two sets of image data representing two images;

image rotating means for rotating the two images represented by the two sets of image data about respective optical axes of said two image taking means by 90 degrees in a state that the two images are disposed on a same plane before and after rotation;

image merge means for merging the two images rotated by said image rotating means into a single image through an electrical operation so that an upper side of the image viewed from the first viewpoint before rotation coincides with a lower side of the image viewed from the second viewpoint before rotation;

image reducing means for reducing the single image obtained by said image merge means at a predetermined reduction ratio through an electrical operation; and storage means for storing image data representing the reduced image obtained by said image reducing means.

4. The stereoscopic picture obtaining device according to claim 3, wherein said image rotating means rotates the two images to a same direction.

5. The stereoscopic picture obtaining device according to claim 3, wherein said image reducing means reduces the single image obtained by said image merge means to change an aspect ratio of the single image.

* * * * *